United States Patent
Harano et al.

[11] Patent Number: 5,736,799
[45] Date of Patent: Apr. 7, 1998

[54] MINIATURE ELECTRIC MOTOR HAVING BEARING UNIT

[75] Inventors: Junichi Harano; Shigeyoshi Iwamoto; Mitsuo Kase, all of Chiba-ken, Japan

[73] Assignee: Mabuchi Motor Co., Ltd., Matsudo, Japan

[21] Appl. No.: 780,133

[22] Filed: Dec. 26, 1996

Related U.S. Application Data

[63] Continuation of Ser. No. 344,649, Nov. 18, 1994, abandoned.

[30] Foreign Application Priority Data

Apr. 6, 1994 [JP] Japan .................. 6-093053

[51] Int. Cl.$^6$ .................................................. H02K 5/16
[52] U.S. Cl. .............................. 310/90; 310/88; 310/89; 310/90.5; 384/107; 384/112; 384/113
[58] Field of Search ..................... 310/90, 90.5, 88; 384/107, 112, 113

[56] References Cited

U.S. PATENT DOCUMENTS

| | | | |
|---|---|---|---|
| 3,870,383 | 3/1975 | Morisaki | 384/425 |
| 4,083,612 | 4/1978 | Olson | 384/425 |
| 4,130,325 | 12/1978 | Schultenkamper | 384/425 |
| 4,322,116 | 3/1982 | Heinemann et al. | |
| 4,613,778 | 9/1986 | Wrobel et al. | |
| 4,800,309 | 1/1989 | Lakin | 310/90 |
| 4,824,244 | 4/1989 | Miyata et al. | 356/133 |
| 4,884,955 | 12/1989 | Richardson, Jr. | 418/1 |
| 5,097,164 | 3/1992 | Nakasugi et al. | 310/88 |
| 5,133,651 | 7/1992 | Onoda et al. | 418/55.6 |

FOREIGN PATENT DOCUMENTS

| | | |
|---|---|---|
| 0 023 657 | 2/1981 | European Pat. Off. |
| 32 13418 | 11/1982 | Germany |
| 52-89602 | 12/1977 | Japan |
| 55-32411 | 3/1980 | Japan |
| 61-58844 | 4/1986 | Japan |
| 62-2350 | 1/1987 | Japan |
| 63-66055 | 5/1988 | Japan |
| 1-64957 | 4/1989 | Japan |

OTHER PUBLICATIONS

Patent Abstract of Japan, vol. 9, No. 4 (E-288) [1727] dated Jan. 10, 1985, titled Small-Sized Motor.
Patent Abstract of Japan, vol. 10, No. 100 (M-470) [2157] dated Apr. 16, 1986, titled Dynamic Pressure Thrust Bearing.
European Search Report, Application No. EP 94 30 8308, dated Jul. 19, 1995.

*Primary Examiner*—Steven L. Stephan
*Assistant Examiner*—Elvin G. Enad
*Attorney, Agent, or Firm*—Armstrong, Westerman, Hattori, McLeland & Naughton

[57] ABSTRACT

A miniature motor having a rotor arranged within a casing within which a stator is mounted, and a rotary shaft of the rotor is supported by bearing units mounted on both ends of the casing. One of the bearing units is provided with a thrust receiving member for supporting an end portion of the rotary shaft in a thrust direction, and a bearing for supporting the rotary shaft in a radial direction within a rotary shaft insertion hole. The thrust receiving member having a dimension that is equal to or smaller than an inner diameter of a bottomed recess formed in the casing is laid on a flat bottom surface of the bottomed recess. The bearing is securely fixed within the bottomed recess and contacted against the thrust receiving member. The rotary shaft insertion hole is in fluid communication with a through-hole formed in a bottom plate of the bottomed recess. Thus, it is possible to shorten an axial length of the motor and to stably support the rotary shaft while preventing any deformation of the thrust receiving member. It is also possible to ventilate air entrained in the insertion hole when the rotary shaft is inserted into the insertion hole of the bearing impregnated with lubricating oil.

26 Claims, 15 Drawing Sheets

MINIATURE ELECTRIC MOTOR HAVING BEARING UNIT

This application is a continuation of application Ser. No. 08/344,649, filed Nov. 18, 1994, now abandoned.

BACKGROUND OF THE INVENTION

1. Field of the Invention

The present invention relates to a miniature electric motor and, more particularly to a miniature electric motor used for audio visual equipment such as CD (Compact disk) players, optical precision equipment, such as compact cameras, and office automation equipment, such as copiers.

2. Description of the Related Art

Miniature electric motors have been widely used in various fields in addition to the above-specified equipment and have been developed particularly in miniaturization in weight and size with more performance.

In a conventional miniature motor, a recess for receiving one of bearing units is formed in a cover member, and an arcuate groove is formed around a bottom of the recess. An air vent hole is formed in the groove. Through-holes are formed in parallel with a rotary shaft in a radial bearing for radially supporting the rotary shaft in addition to a rotary shaft insertion hole.

A plate-like thrust bearing member for supporting the rotary shaft in a thrust direction is inserted under pressure into an interior of the recess so as to keep a predetermined gap relative to the radial bearing.

In such a motor, it is necessary to mold the arcuate groove in the recess and it is difficult to perform the molding work. In particular, whenever the cover member is made of metal, the wear rate of molds for molding and pressing the arcuate groove is high. As a result, the molds are inferior in durability and a considerable amount of maintenance is required.

Because the thrust bearing member is inserted under pressure into the recess, if it is made of synthetic resin in the form of a plate with a good lubricating properties, a warpage is likely to develop in its peripheral portion. Also in the case where warpage would not occur, a central portion is projected to lift away from a bottom of the recess.

If the thrust bearing member is deformed in this manner, a gap is generated between the bottom of the recess and the thrust bearing member. Then, the rotor is movable the axial direction during the motor drive operation so that contact between the commutator and brushes would be unstable, thus generating change in rotation.

In order to prevent the above-described deformation of the thrust bearing member, it is proposed to set the thrust bearing member at the bottom of the recess by decreasing a diameter of the thrust bearing member without any pressure. However, in this case, when the rotary shaft is rotated, the thrust bearing member is rotated together therewith. The service life of the thrust bearing member would be shortened, resulting from the friction between the thrust bearing member and the bottom of the recess.

On the other hand, if the bearing would be in contact with the thrust bearing member in order to shorten the overall length of the motor in the axial direction, the rotary shaft insertion hole becomes clogged with the thrust bearing member.

Then, when the rotary shaft is inserted into the rotary shaft insertion hole in assembling the motor, stagnant air in the insertion hole passes through the interior of the bearing. As a result the lubricating oil impregnated in the bearing would be splashed in the interior of the motor from the surface of the bearing together with the air. The splashed oil would be adhered to the commutator and the brushes, resulting in failure of the electrical contact. The frictional worn powder would be adhered and accumulated thereto to cause the electric conduction between the commutator elements.

Accordingly, it is necessary to form a gap between the bearing and the thrust bearing member in the conventional structure. In addition, in the conventional structure, since the arcuate groove is formed, a projection length of a projecting portion where the recess is formed is large. As a result, the overall length of the casing in the axial direction is elongated to make it difficult to miniature the motor.

SUMMARY OF THE INVENTION

In order to overcome the above-noted defects, an object of the present invention is to provide a miniature electric motor provided with bearing units for stable supporting a rotary shaft in a thrust direction without deforming a thrust bearing member while shortening an axial length of the motor.

Also, another object of the present invention is to provide a miniature motor wherein whenever a rotary shaft is inserted into a rotary shaft insertion hole of a bearing impregnated with a lubricating oil, the air entrained in the insertion hole is removed so as not to splash the oil, retained in the bearing, toward an interior of the motor, to thereby prevent the oil from adhering to a commutator and brushes to enhance the quality of the motor.

Still another object of the present invention is to provide a miniature motor in which lubrication of a sliding part between the rotary shaft and the bearing is maintained to suppress a frictional wear.

Further, still another object of the present invention is to provide a miniature motor in which durability of molds for press molding a casing may be enhanced.

In order to attain these and other objects, according to the present invention, there is provided a miniature electric motor in which a rotor is arranged in a casing within which a stator is mounted, and a rotary shaft of the rotor is rotatably supported by two of bearing units each mounted on each end portion of the casing. One of the bearing units comprises a thrust receiving member for supporting an end portion of the rotary shaft in a thrust direction, and a bearing securely fixed in the bottomed recess and brought into pressing contact with the thrust receiving member for supporting the rotary shaft in a rotary shaft insertion hole in a radial direction. The thrust receiving member is laid on a flat bottom surface of a bottomed recess formed in the casing, with a dimension equal to or smaller than that of the bottomed recess. The rotary shaft insertion hole and a through-hole formed in a bottom plate of the bottomed recess are in fluid communication with each other.

The thrust receiving member has a predetermined shape to cover a part of the bottom surface, while always maintaining a communication passage between the rotary shaft insertion hole and the through-hole.

The thrust receiving member has a plurality of apex portions for always allowing communicating between the rotary shaft insertion hole and the through-hole through a space between the thrust receiving member and an inner circumferential surface of the bottomed recess.

Assuming that a center of the circle of the through-hole is represented by b, the following relationship is established:

f>e where e is the dimension of the thrust receiving member in a direction perpendicular to a line d passing through the center b and the center of the thrust receiving member, and f is the diameter of the through-hole.

The rotary shaft insertion hole and the through-hole are always kept under a fluid communication with each other through the space, if a circle of the rotary shaft insertion hole is larger than an inscribed circle of the thrust receiving member.

A bevelled portion is formed in an inner circumferential edge of the rotary shaft insertion hole on the side of the thrust receiving member, a bevel circle of the bevelled portion is larger than an inscribed circle of the thrust receiving member, and the rotary shaft insertion hole and the through-hole are always kept in fluid communication with each other through the space, if a circle of the rotary shaft insertion hole is smaller than the inscribed circle.

A slant angle Θ of the bevelled portion relative to a surface of the thrust receiving member is made small so that a sliding area between the bearing and the rotary shaft is enlarged.

The thrust receiving member is substantially shaped in the form of a polygon, such as a regular triangular shape, a square, a hexagonal shape or the like.

In one embodiment, the thrust receiving member is may be substantially in the form of a regular hexagonal shape and the through-hole is formed in the vicinity of the inner circumferential surface.

In another embodiment, the thrust receiving member has a shape similar to a regular square, an arcuate portion having the same center as that of the inner circumferential surface is formed in an associated apex of the thrust receiving member, and the through-hole is formed into an oblong hole extending in the circumferential direction and in the vicinity of the inner circumferential surface.

In another embodiment, the thrust receiving member has a plurality of tapered apex portions and a central portion having a reduced diameter.

An outer dimension of the bearing is rather larger than the rotary shaft insertion hole, and a circumscribed circle of the thrust receiving member is rather larger than the rotary shaft insertion hole.

If the rotary shaft insertion hole is small so that a circle of the insertion hole is not crossed with the communication holes, a bevelled portion is formed in the bearing with a bevel circle of the bevelled portion being crossed with the communication holes, thereby always communicating the rotary shaft insertion hole and the communication holes with each other through the bevelled portion; and the through-hole is in the form of an oblong hole so that the through-hole is always in fluid communication with at least one of the communication holes.

A bevelled portion is formed in an inner circumferential edge of the rotary shaft insertion hole on a side of the thrust receiving member, thereby always communicating the rotary shaft insertion hole with the through-hole with each other through the bevelled portion.

The thrust receiving member has an outer dimension that is substantially equal to or somewhat smaller than a diameter of an inner circumferential surface of the bottomed recess and is laid on the bottom surface without any pressing forces; and the bearing is inserted under pressure into the bottomed recess, and the thrust receiving member sandwiched between the bearing and the bottom surface is kept under a non-rotatable condition.

The casing includes: a housing formed of conductive material such as a cold pressed steel plate in a bottomed hollow shape; and a cover member composed of a disk plate made of the same material as that of the housing and mounted in an opening portion of the housing. The two bearing units are mounted on the cover member and the housing, respectively, a bottomed hollow cylindrical projection extending to an outside of the motor is integrally formed in a central portion of the cover member, an inside of the projection is the bottomed recess, and an entirety of the bottom surface of the bottomed recess is formed to be flat without any grooves.

The thrust receiving member is made of synthetic resin having a good lubrication substantially in the form of a regular triangular with each apex portion being defined by a smooth curved surface, and the thrust receiving member having an outer dimension which is substantially the same or somewhat smaller than a diameter of an inner circumferential surface of the bottomed recess is laid on the bottom surface without any pressing forces; the bearing is securely fixed within the bottomed recess, the thrust receiving member sandwiched between the bearing and the bottom surface being kept under a non-rotatable condition; and a circle of the rotary shaft insertion hole is smaller than an inscribed circle of the thrust receiving member, a bevelled portion is formed at an inner circumferential edge of the rotary shaft insertion hole on a side of the thrust receiving member, a bevel circle of a larger diameter portion of the bevelled portion is larger than the inscribed circle, and the rotary shaft insertion hole and the through-hole are always kept in fluid communication with each other through a space between the thrust receiving member and the inner circumferential surface.

Thus, the thrust receiving member may be mounted within the bottomed recess without any pressing forces, and a gap between the bearing and the thrust receiving member may be dispensed with. Also, when the rotary shaft is rotated, the thrust receiving member is kept under a stationary condition and is not rotated. Accordingly, it is possible to shorten an axial length of the motor. Also, without deforming the thrust receiving member, it is possible to stably support the rotary shaft in the thrust direction.

Also, the rotary shaft insertion hole formed in the bearing impregnated with the lubricating oil is in fluid communication with the through-hole formed in the bottom surface of the bottomed recess. Therefore, when the rotary shaft is inserted into the rotary shaft insertion hole formed in the bearing, the air that has been stagnant within the insertion hole is discharged to the outside of the motor through the through-hole. Accordingly, there is no likelihood of the air being introduced into the interior of the bearing and there is no likelihood that the oil would splash to the motor interior by the air. The oil is prevented from sticking to a commutator, brushes or the like to thereby enhance the quality of the motor.

DESCRIPTION OF THE PREFERRED EMBODIMENTS

The conventional structure will now be described with reference to FIGS. 18 through 20 for the sake of better understanding the present invention.

Figure 18:
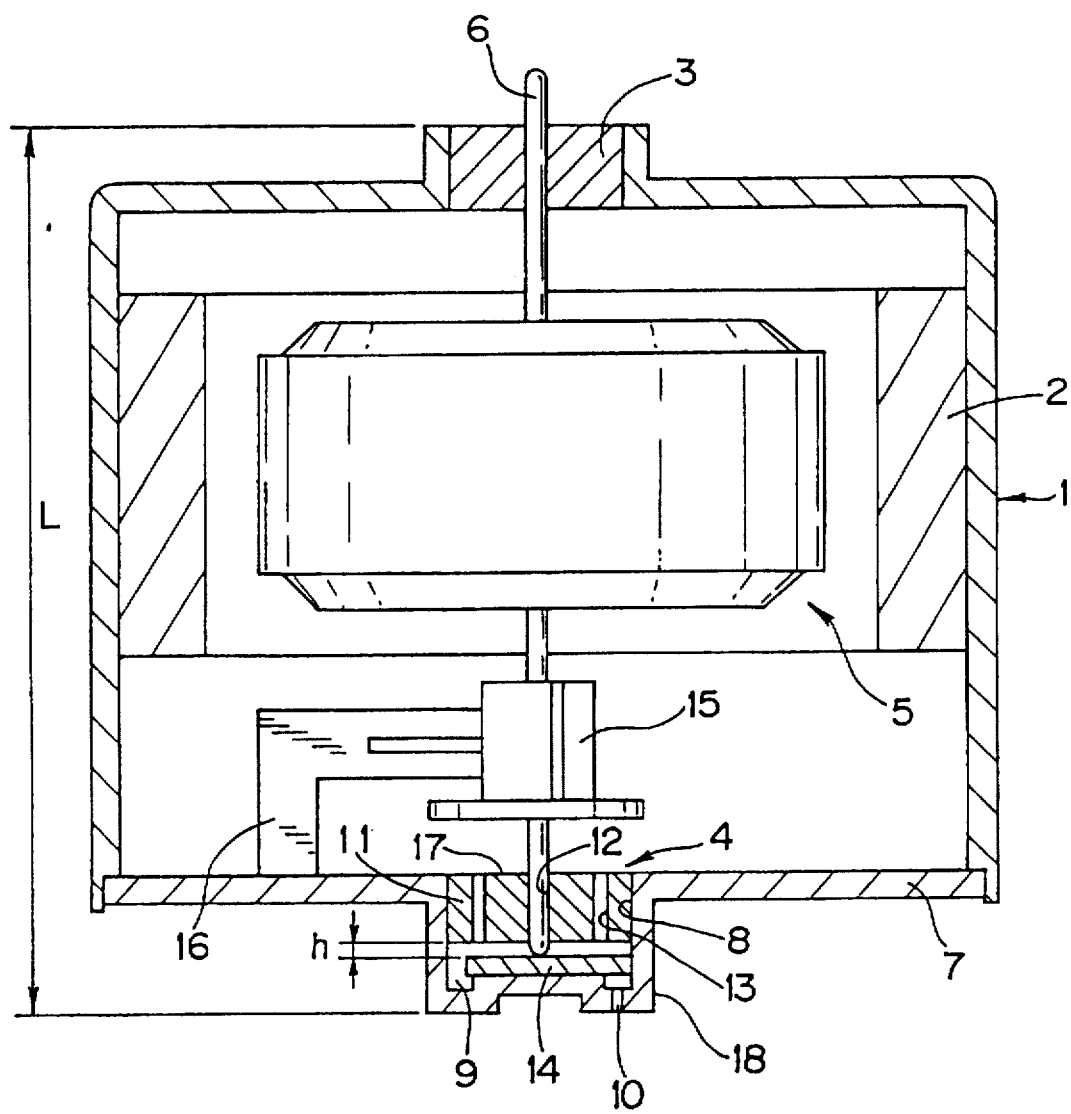
FIG. 18 is a front sectional view showing a conventional motor.
Figure 19:
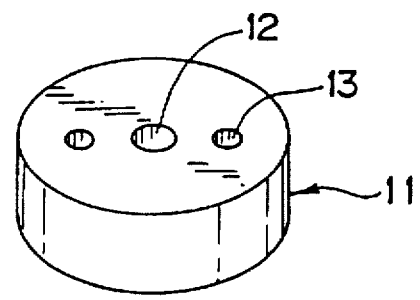
FIG. 19 is a perspective view showing a bearing of the motor shown in FIG. 18.

As shown in FIGS. 18 and 19, in a miniature electric motor, a stator 2 is mounted on an inner surface of a casing 1, and a rotary shaft 6 of a rotor 5 is rotatably supported by bearing units 3 and 4 provided at both end portions of the motor.

A recess 8 is formed in a cover member 7 of the casing 1, an arcuate groove 9 is formed in a peripheral portion of a bottom of the recess 8. An air vent hole 10 is formed in the groove 9. Through-holes 13 are formed in a bearing 11 for supporting the rotary shaft 6 in a radial direction in addition to a rotary shaft insertion hole 12, and are formed in parallel with an axial direction.

A plate-like thrust bearing member 14 for supporting the rotary shaft 6 in a thrust direction is inserted under pressure into an interior of the recess 8. A predetermined distance h is kept between the bearing 11 and the thrust bearing member 14. For this reason, it is necessary to mold the arcuate groove 9 in the recess 8 and its molding work is difficult. In particular, in the case where the cover member 7 is made of metal, molds for press-molding the arcuate groove 9 would be remarkably damaged. Thus, the molds are inferior in durability and it is necessary to frequently carry out maintenance.

The thrust bearing member 14 is inserted under pressure into the recess 8. Therefore, if it is made of synthetic resin in the form of a plate with a good lubricant property, a warp would be likely to be formed in its peripheral portion in the case where the thickness of the plate is equal to or less than 0.25 mm. Also in the case where the warp would not occur, its central portion is projected to lift away from the bottom of the recess 8.

If the thrust bearing member 14 is deformed in this manner, a gap is generated between the bottom of the recess 8 and the thrust bearing member 14. Then, the rotor 5 is moved in the axial direction in the motor drive operation so that the contact between a commutator 15 and brushes 16 would be unstable, thus generating change in rotation.

In order to prevent the above-described deformation of the thrust bearing member 14, it is proposed to set the thrust bearing member 14 on the bottom of the recess 8 by decreasing a diameter of the thrust bearing member 14 without any pressure. However, in this case, when the rotary shaft 6 is rotated, the thrust bearing member 14 is rotated together therewith. A service life of the thrust bearing member would be shortened, resulting from the friction between the thrust bearing member 14 and the bottom of the recess 8.

On the other hand, if the bearing 11 would be in contact with the thrust bearing member 14 in order to shorten the overall length L of the motor in the axial direction, the rotary shaft insertion hole 12 is clogged with the thrust bearing member 14.

Then, when the rotary shaft 6 is inserted into the rotary shaft insertion hole 12 in assembling the motor, stagnant air in the insertion hole 12 would pass through the interior of the bearing 11. As a result, the lubricating oil impregnated in the bearing 11 would be splashed in the interior of the motor from the surface 17 of the bearing 11 together with the air. The splashed oil would be adhered to the commutator 15 and the brushes 16, resulting in failure of the electrical contact. Also, the frictional worn powder would be adhered and accumulated thereto to cause the electric conduction between the commutator elements.

Accordingly, it is necessary to form the gap h between the bearing 11 and the thrust bearing member 14 in the conventional structure. In addition, in the conventional structure, since the arcuate groove 9 is formed, a projection length of a projecting portion 18 where the recess 8 is formed is large. As a result, the overall length L of the casing 1 in the axial direction is elongated to make it difficult to thin the motor.

By the way, in the case where the bearing 11 is impregnated with the lubricating oil as described above, a so-called "pump action" in which the oil in the bearing interior is moved to the surface of a space formed in the bearing interior and permeated onto the surface is generated. As a result of the pump action, the sliding part between the rotary shaft 6 and the rotary shaft insertion hole 12 is always lubricated.

Figure 20:
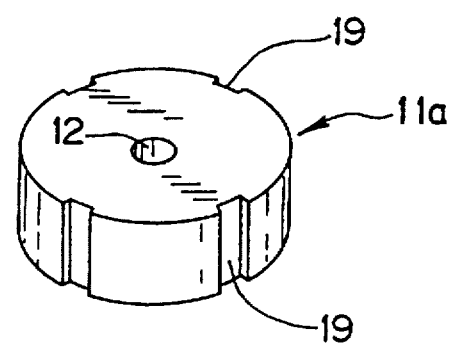
FIG. 20 is a perspective view showing a bearing provided in another conventional motor.

However, if the through-holes 13 are formed in addition to the rotary shaft insertion hole 12 as in this motor, or otherwise if cutaways 19 or the like for ventilating the air in the assembling the rotary shaft in the conventional bearing 11a as shown in FIG. 20 is formed, the pump action works outwardly from the center of the bearing 11 or 11a so that the oil is moved toward the surface of the through-holes 13 and the cutaways 19.

As a result, the oil is insufficiently supplied to the rotary shaft insertion hole 12 thereby causing wear of the sliding portions. For this reason, it is preferable not to form the through-holes 13 and the cutaways 19 in the bearing 11 or 11a.

The present invention will now be described by way of example with reference to FIGS. 1 through 17.

(FIRST EMBODIMENT)

FIGS. 1 through 5 show a first embodiment of the invention.

Figure 1:
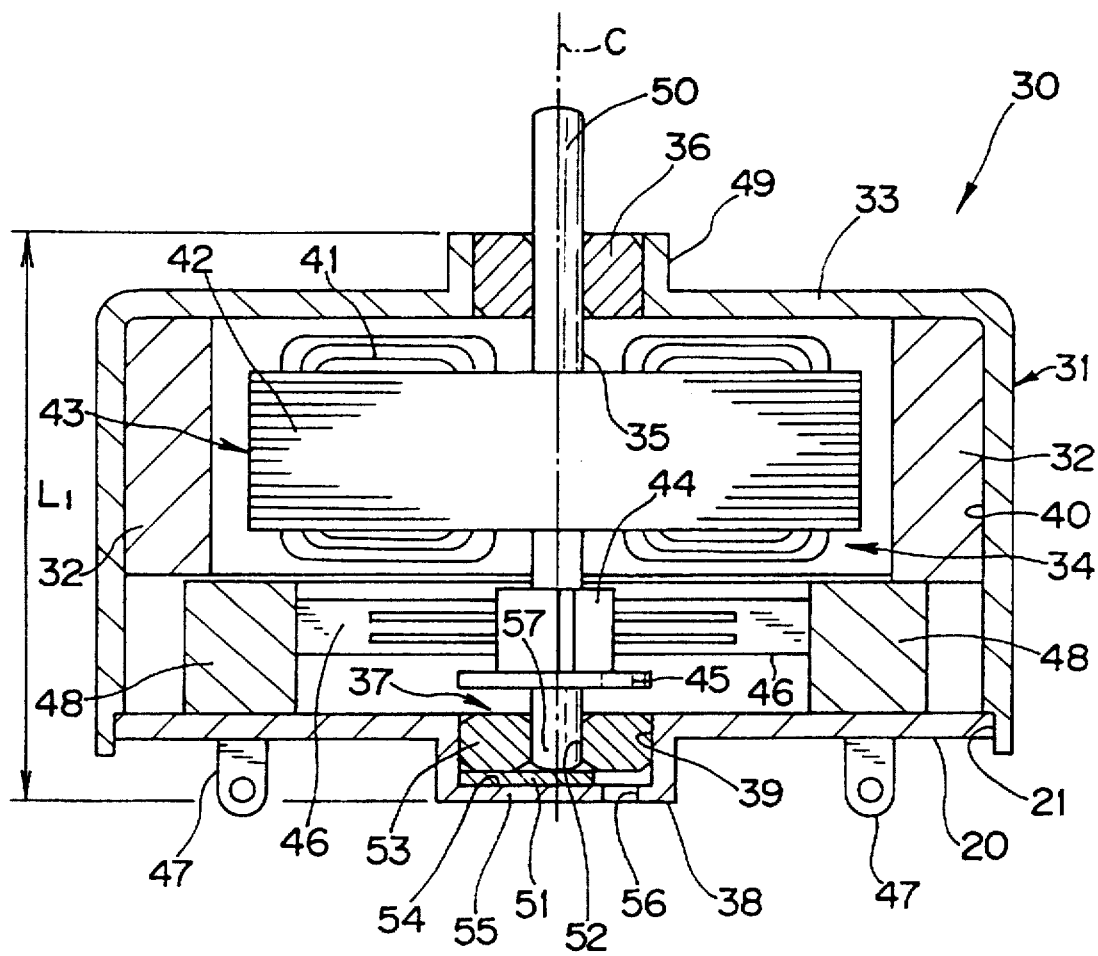
FIG. 1 is a front sectional view showing a miniature electric motor according to a first embodiment of the present invention.
Figure 2:
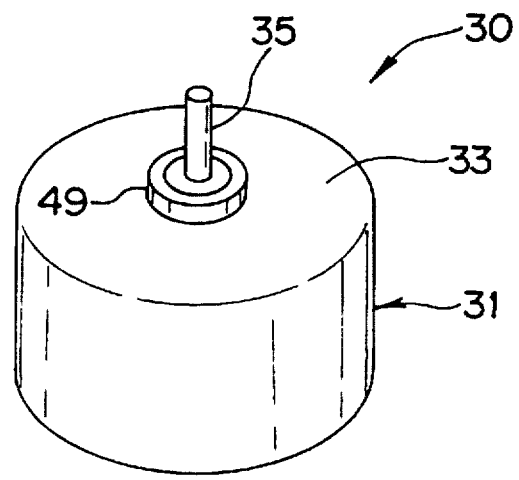
FIG. 2 is a perspective view showing an outer appearance of the motor shown in FIG. 1.

As shown in FIGS. 1 and 2, a miniature DC motor 30 is provided with a casing 31. The casing 31 has a housing 33 in which a stator 32 is mounted, and a cover member 20 mounted on an opening portion 21 of the housing 33. A rotor 34 is provided within the casing 31.

The housing 33 is made of conductive material such as a cold pressed steel plate mainly consisting of, for example, soft steel in the form of a bottomed hollow shape. Also, the cover member 20 engaged with the opening portion 21 of the housing 33 is formed of the same material in the form of a disk.

Bearing units 36 and 37 mounted on both end portions of the casing 31 rotatably support a rotary shaft 35 of the rotor 34. One bearing unit 37 is mounted on the cover member 20 and the other bearing unit 36 is mounted on the housing 33.

A bottomed hollow-shaped projection 38 projecting to an outside of the motor is integrally formed in a central portion of the cover member 20 by press-molding or drawing work. A bottomed recess 39 in which the bearing unit 37 is received is formed in an interior of the projection 38. A conventional arcuate groove is not formed in a bottom 54 of the bottomed recess 39 but the entire bottom 54 is made flat.

The stator 32 is fixed to a cylindrical inner surface 40 of the housing 33 and is composed of a pair of permanent magnets each formed into an arc segment and made of magnetic material such as hard ferrite.

The rotor 34 is provided with the rotary shaft 35 extending in a direction of a center axis C about which the rotor is rotated, an armature 43 which is mounted to the rotary shaft 35 and to which the rotational torque is imparted from the permanent magnet 32, and a commutator 44 assembled in a cylinder. The commutator 44 is mounted on the rotary shaft 35 and is electrically connected to the armature 43. An armature winding 41 is mounted in shape of coil around a rotor core 42 of the armature 43. The armature 43 is provided within the permanent magnet 32 at a predetermined air-gap relative to the permanent magnet 32.

An oil stop washer 45 is securely fixed to the rotary shaft 35 at a lower end portion of the commutator 44 for preventing the oil of the bearing unit 37 from flowing toward the commutator 44.

A plurality of (for example, two) pairs of brushes 46 each made of conductive material such as metal or carbon are provided in the cover member 20 so that the brushes 46 slidingly engage with the commutator 44. A plurality of (for example, two) connecting terminals 47 each electrically connected to the brush 46 are mounted on the cover member 20 through a brush holder 48 made of electrical insulating material such as synthetic resin or the like.

A cylindrical projection 49 is formed in the central portion of the housing 33 by press-molding or drawing. The bearing unit 36 is fixed under pressure to an inner circumferential surface of the projection 49. The bearing unit 36 rotatably supports the rotary shaft 35 on the output portion 50 side and rotatably supports the rotary shaft 35 in a radial direction.

The bearing unit 37 rotatably supports an opposite output portion of the rotary shaft 35 is provided with a thrust receiving plate-like member 51 for supporting an end portion 57 of the rotary shaft 35 in a thrust direction, and a bearing 53 for supporting the rotary shaft 35 within a rotary shaft insertion hole 52 in the radial direction.

It is possible to make the bearing unit 36 and the bearing 53 of plastic or general metal material. However, it is preferable to form these components 36 and 53 of powder sintered metal or powder sintered alloy of iron copper system impregnated with lubricating oil because the lubrication with the rotary shaft 35 is good and these components 36 and 53 are maintenance-free.

It is preferable to form the thrust receiving member 51 of synthetic resin having good lubrication properties. For example, it is possible to select, for this, Polyslider (trade name of K.K. Asahi Polyslider, in which additives are added to nylon 6) or Somasheet (trade name of Somar Corporation, in which additives are added to nylon 66).

Figure 3:
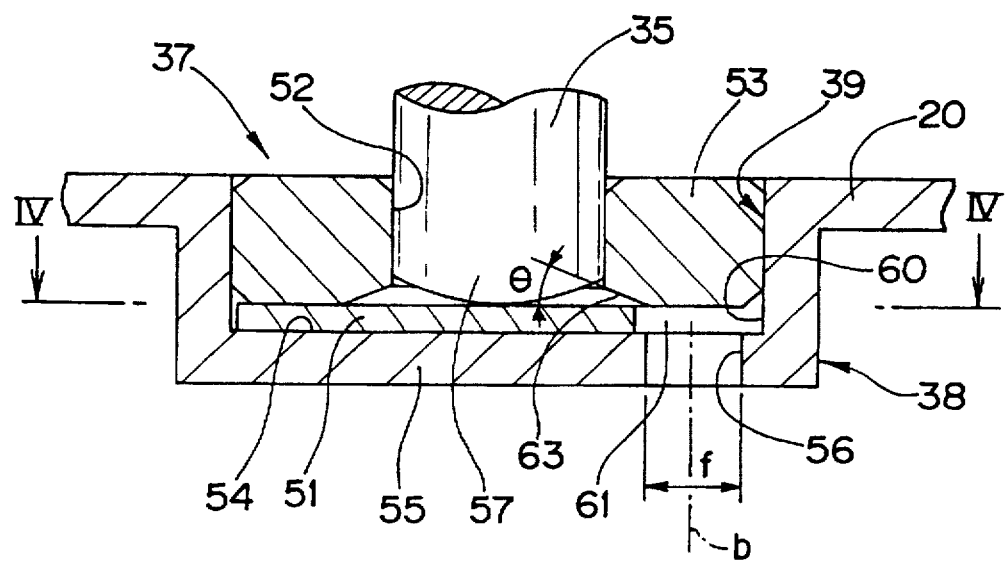
FIG. 3 is an enlarged sectional view showing a primary part of the motor shown in FIG. 1.

As shown in FIGS. 1 and 3, the thrust receiving member 51 has a diameter that is equal to or smaller than an inner diameter of the bottomed recess 39 formed in the casing 31, i.e., equal to or somewhat smaller than the inner diameter. The thrust bearing member 51 is disposed on a planar bottom surface 54 of the bottomed recess 39. The bearing 53 is securely fixed in the bottomed recess 39 by pressing or the like, and is brought into pressing contact with the thrust bearing member 51. Thus, the thrust bearing member 51 is closely clamped or sandwiched between the bottom 54 and the bearing 53 so as not to be rotatable.

A through-hole 56 that is in fluid communication with an outside of the motor is formed in the bottom plate 55 of the bottomed recess 39. The rotary shaft insertion hole 52 and the through-hole 56 are in fluid communication with each other. Namely, the thrust receiving member 51 has a predetermined shape which does not cover an entire surface of the bottom surface 54 but instead covers only a part thereof so that a communication passage may be always maintained between the rotary shaft insertion hole 52 and the through-hole 56. In the embodiment shown, the single through-hole 56 is used but it is apparent that a plurality of through-holes may be used.

In the motor 30 having the above-described structure, when a current flows from the connecting terminals 47 through the brushes 46 and the commutator 44 to the armature winding 41, a rotational torque is imparted to the rotor 34 that is present in the magnetic field formed by the pair of permanent magnets 32. Therefore, the rotor 34 takes a rotational motion. Then, the motor 30 drives a CD player (not shown) or the like through the output portion 50 of the rotating rotary shaft 35.

The bearing unit 37 mounted on the bottomed recess 39 will now be explained in more detail.

Figure 4:
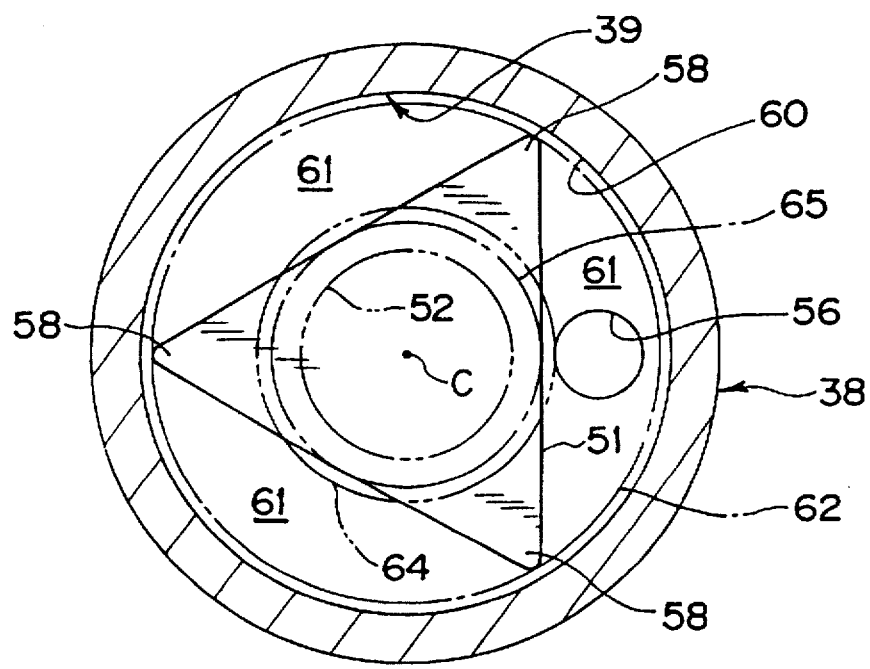
FIG. 4 is a cross-sectional view taken along the line 4—4 of FIG. 3.

As shown in FIGS. 3 and 4, it is preferable that the thrust receiving member 51 is formed substantially in a form of a polygonal shape, and that the rotary shaft insertion hole 52 and the through-hole 56 are always in fluid communication with each other through a space 61 between the thrust receiving member 51 and an inner circumferential surface 60 of the bottomed recess 39. Accordingly, in the embodiment shown, the thrust receiving member 51 is formed substantially the shape of a regular triangle.

The thrust receiving member 51 is laid on the bottom surface 54 of the bottomed recess 39 without using pressing forces, whereby it is possible to avoid any deformation such as projection of a central portion or warp of a peripheral portion of the thrust receiving member 51. For this purpose, an outer dimension of the thrust receiving member 51 (for example, a diameter of a circumscribed circle 62 where all the apex of the polygonal shape are located on the circumference) is equal to or somewhat smaller than a diameter of the inner circumferential surface 60 of the bottomed recess 39.

It is also preferable that the outer diameter of the thrust receiving member 51 is close to the diameter of the inner circumferential surface 60 as shown in FIG. 4 because the thrust receiving member 51 is hardly displaced in the radial direction within the bottomed recess 39 and may be settled in place. It is also preferable that each apex 58 of the thrust receiving member 51 is defined in a smooth curve because the apex 58 would not be hooked by the bottomed recess 39 and the bearing 53.

If a circle of the rotary shaft insertion hole 52 would be smaller than an inscribed circle 65 of the thrust receiving member 51 which circle is located within the polygonal shape and is in contact with each side of the polygonal shape, the thrust receiving member 51 would clog the rotary shaft insertion hole 52.

In view of the above, in the embodiment shown, A bevelled portion 63 is formed by bevelling an inner circumferential edge of the rotary shaft insertion hole 52 on the side of the thrust receiving member 51, and a bevel circle 64 of the larger diameter portion of the bevelled portion 63 is set to be larger than the inscribed circle 65 of the thrust receiving member 51. Thus, it is possible to always keep fluid communication between the rotary shaft insertion hole 52 and the space 61.

Figure 5:
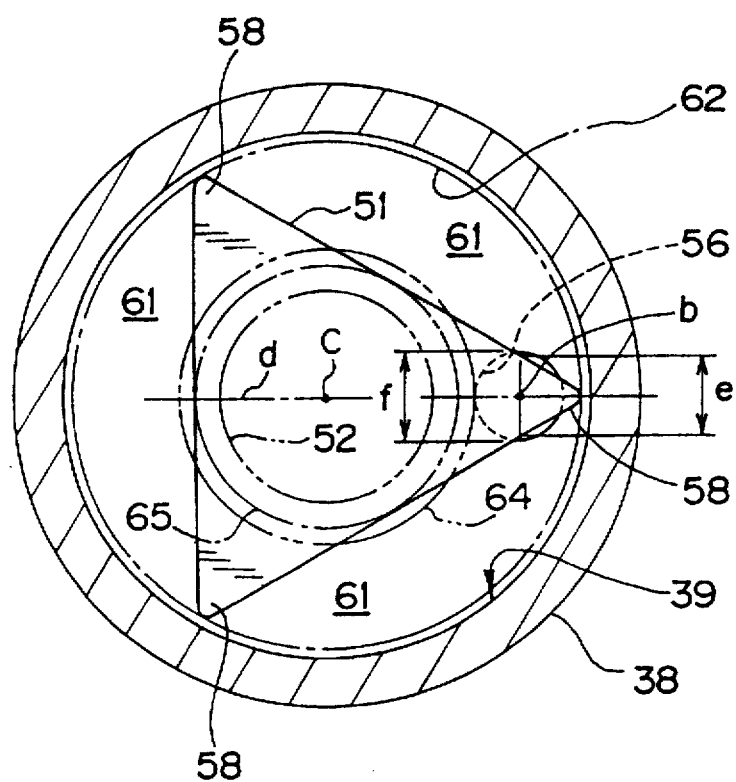
FIG. 5 is a cross-sectional view showing a state where a thrust receiving member is set at a different position.

FIG. 5 shows an arrangement where the thrust receiving member 51 is set to be located at a position different from that shown in FIG. 4.

In this case, even if one of the apexes 58 of the thrust receiving member 51 is set in the direction of the through-hole 56, there is no fear that the through-hole 56 is clogged or closed by the thrust receiving member 51.

Assuming that a center of the circle of the through-hole 56 is represented by b, the following relation is given:

f>e where e is the dimension of the thrust receiving member 51 in a direction perpendicular to a line d passing through the center b and the center of the thrust receiving member 51, and f is the diameter of the through-hole 56.

To meet this relation, it is possible to always bring the space 61 and the through-hole 56 into fluid communication with each other whenever the thrust receiving member 51 is laid on the bottom surface 54 of the bottomed recess 39 about the center axis C. Accordingly, there is no limit to mounting the thrust receiving member 51 and the latter 51 may be set without pressing forces. It is therefore easy to assemble the unit to thereby avoid any assembling error.

In assembling the motor, when the rotary shaft 35 is inserted into the rotary shaft insertion hole 52, stagnant air within the insertion hole 52 will flow to the space 61 through the bevelled portion 63. The air is discharged from the space 61 through the through-hole 56 to the outside of the motor 30.

Accordingly, since the air is not caused to pass through the interior of the bearing 53, there is no fear that the lubricating oil impregnated in the interior of the bearing 53 would be splashed into the interior of the motor together with the air and would be adhered to the sliding parts or the like between the commutator 44 and the brushes 46, which is encountered in the conventional motor. Incidentally, in the case where the oil comes out to the side of the space 61 from the bearing 53, the oil is to be discharged to the outside of the motor and does not splash toward the interior of the motor.

Figure 6:
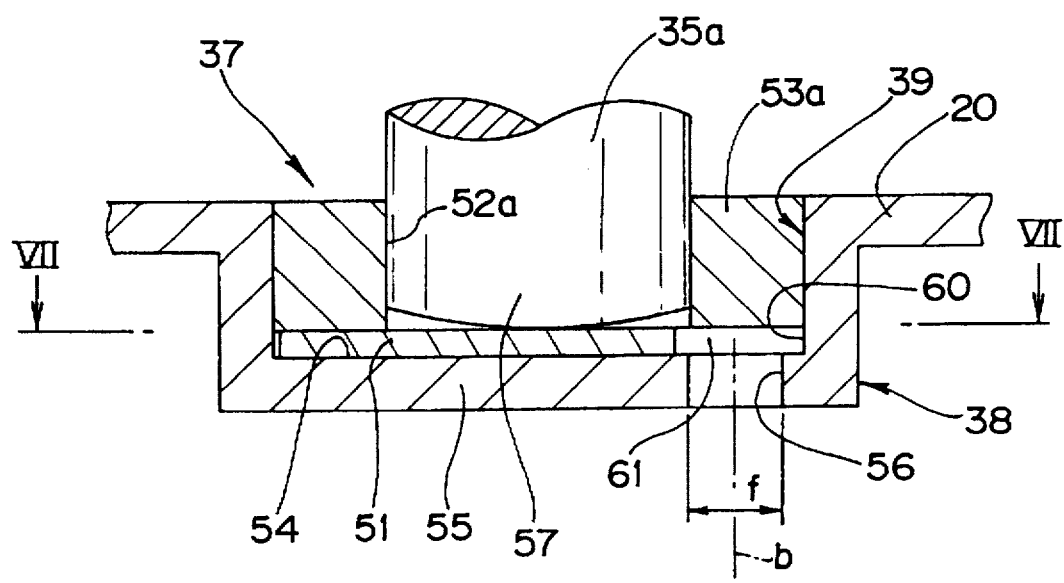
FIG. 6 is an enlarged sectional view, similar to FIG. 2, showing a primary part of a motor according to a second embodiment of the invention.
Figure 7:
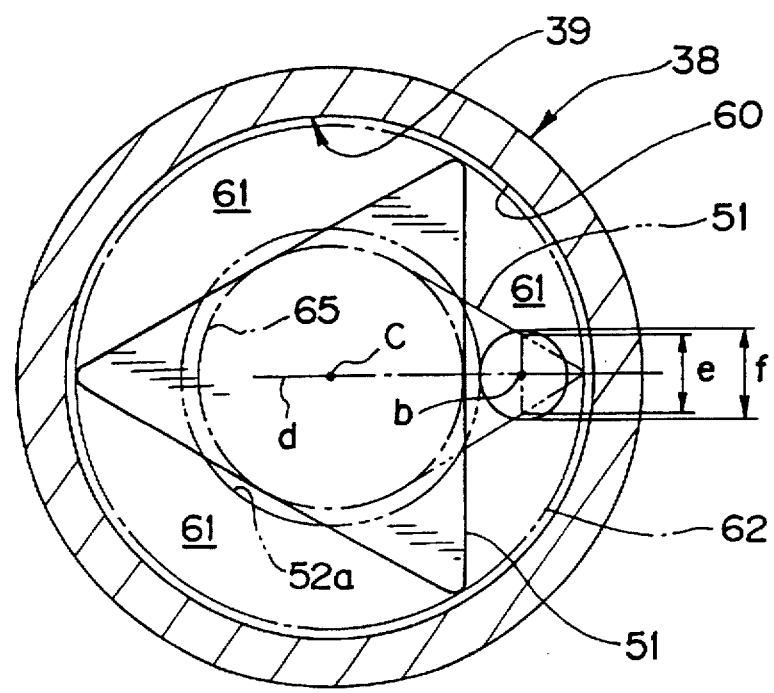
FIG. 7 is a cross-sectional view, similar to FIG. 4, taken along the line 7—7 of FIG. 6.

FIGS. 6 and 7 show a second embodiment of the present invention.

In the second embodiment, the diameter of a rotary shaft insertion hole 52a formed in a bearing 53a is large. Namely, the circle of the rotary shaft insertion hole 52a is larger than the inscribed circle 65 of the substantially regular triangular thrust receiving member 51.

In this case, even if the bevel of the bearing as shown in the first embodiment is lacking, the rotary shaft insertion hole 52a and the space 61 are always in fluid communication with one other. Accordingly, since it is unnecessary to form the bevelled portion in the bearing 53a, it is possible to have a large sliding area between a rotary shaft 35a and the bearing 53a.

The other structure of the second embodiment are the same as that of the first embodiment insured.

Figure 8:
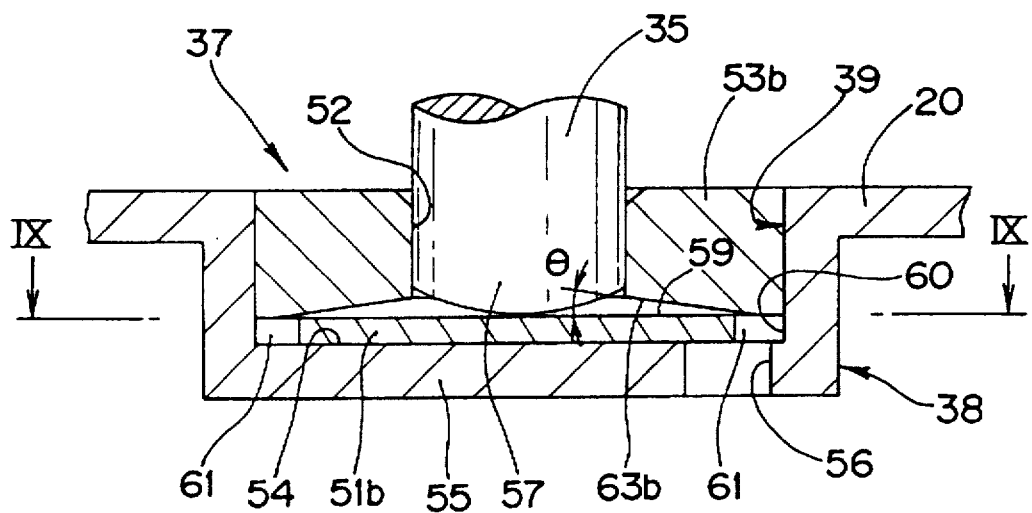
FIG. 8 is an enlarged sectional view, similar to FIG. 3, showing a primary part of a motor according to a third embodiment of the invention.
Figure 9:
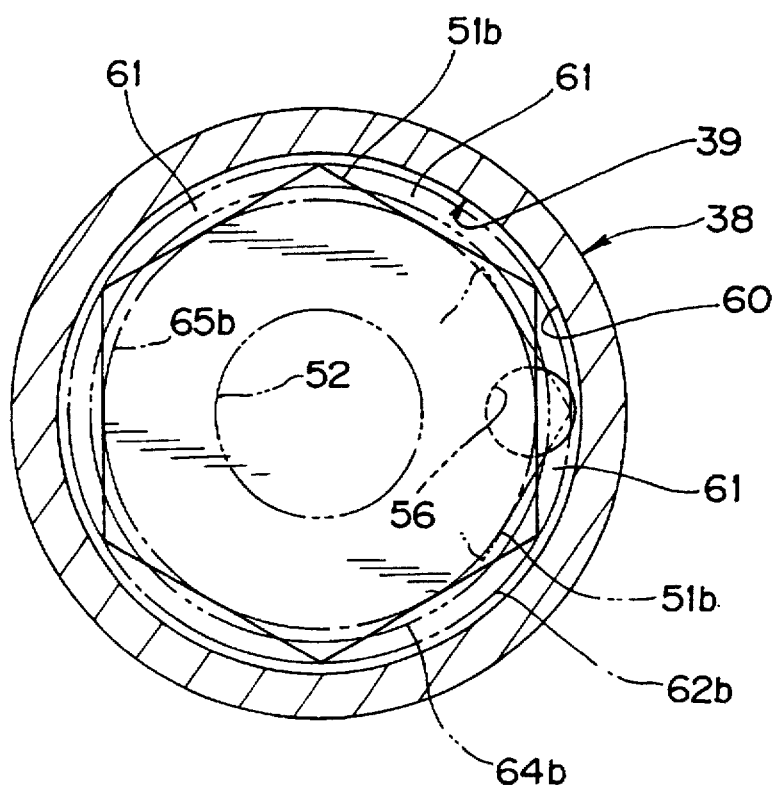
FIG. 9 is a cross-sectional view, similar to FIG. 4, taken along the line 9—9 of FIG. 8.

FIGS. 8 and 9 show a third embodiment of the present invention.

In the third embodiment, a substantially regular hexagonal thrust receiving member 51b is used as the polygonal thrust receiving member. A circumscribed circle 62b of the thrust receiving member 51b is substantially equal to or somewhat smaller than the inner circumferential surface 60. The thrust receiving member 51b is placed within the bottomed recess 39 without pressing forces.

In the case where this thrust receiving member 51b is used, the space 61 is smaller in radial direction than that of the foregoing triangular thrust receiving member 51 and is far away from the rotary shaft insertion hole 52. For this reason, in this embodiment, a bearing 53b is largely bevelled to cause a bevelled portion 53b to be in fluid communication with the space 61.

More specifically, a bevel circle 64b of the bevelled portion 63b is larger than an inscribed circle 65b of the thrust receiving member 51b. Therefore, the rotary shaft insertion hole 52 is always kept in fluid communication with the space 61 through the bevelled portion 63b. If a slant angle θ of the bevelled portion 63b relative to a surface 59 of the thrust receiving member 51b is kept small, it is possible to ensure a large sliding area between the bearing 53b and the rotary shaft 35.

Also, in order to always bring the space 61 and the through-hole 56 in fluid communication with one other, the through-hole 56 is formed at the position in the vicinity of the inner circumferential surface 60. Incidentally, the other structures of the third embodiment are the same as that of the first embodiment.

Figure 10:
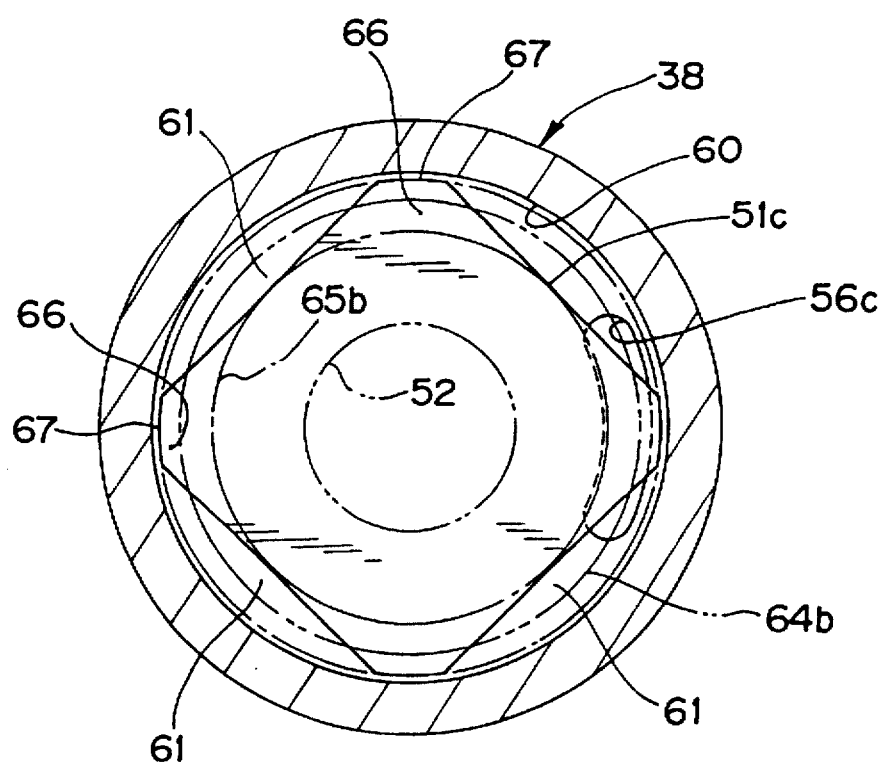
FIG. 10 is a sectional view, similar to FIG. 4, showing a modification of the motor shown in FIG. 9.

FIG. 10 is a view showing a modification of the embodiment shown in FIG. 9. A thrust receiving member 51c is shaped in a substantially polygonal shape such as a shape similar to a regular square. Namely, an arcuate portion 67 having a center concentric with the inner circumferential surface 60 is formed in each apex 66 of the thrust receiving member 51c.

In this case, it is easy to manufacture the thrust receiving member 51c by cutting peripheral portions of a disk plate along a straight line. It is preferable to form a through-hole 56c into an oblong hole (for example, a hole extending in the circumferential direction) in order to always communicate with the space 61, and to locate it in the vicinity of the circumferential surface 60. Incidentally, the other structures of this modification are the same as that of the third embodiment shown in FIG. 9.

Figure 11:
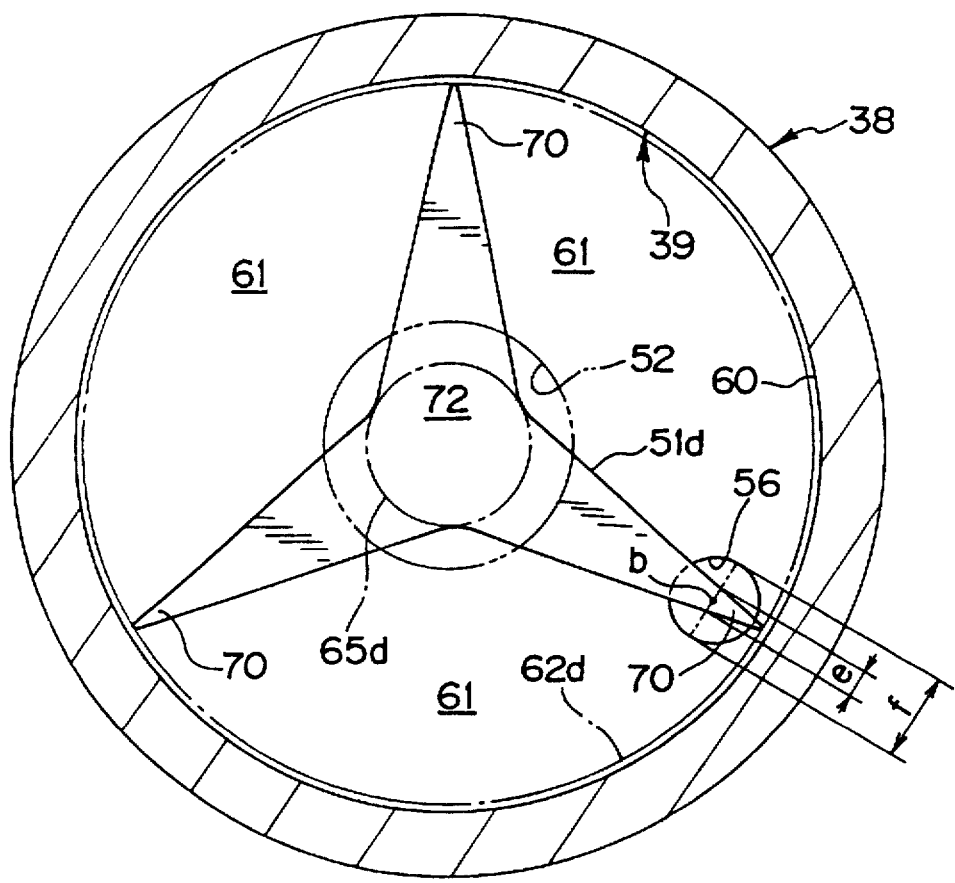
FIG. 11 is a sectional view, similar to FIG. 5, showing a part of a motor according to a fourth embodiment of the invention.
Figure 12:
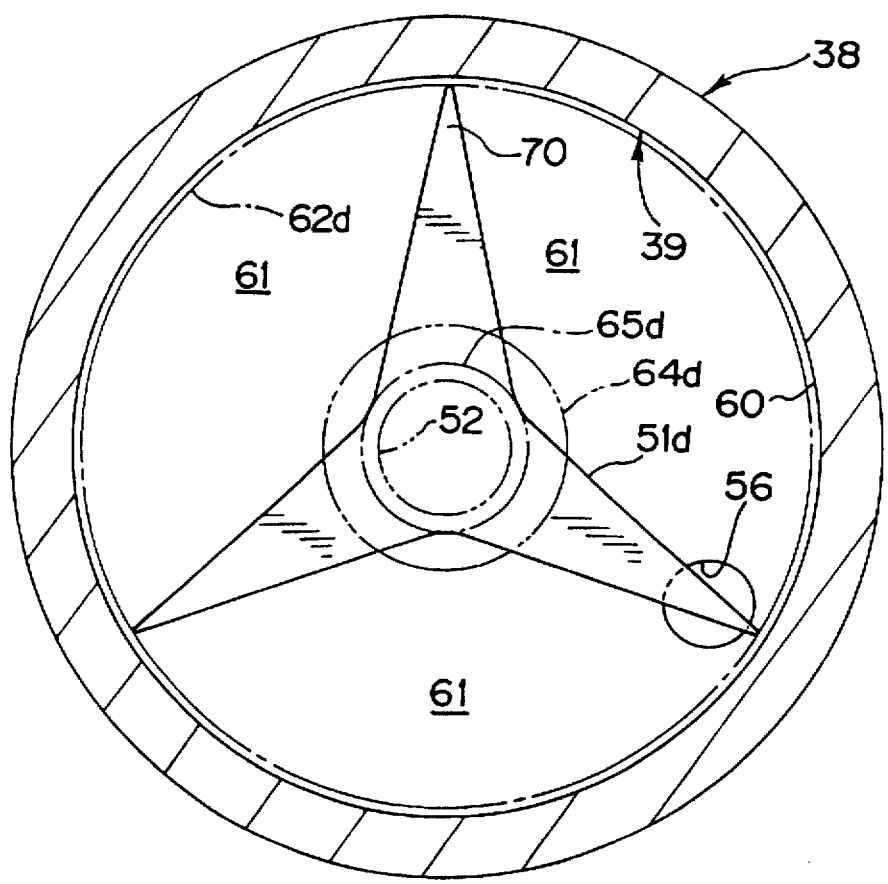
FIG. 12 is a sectional view showing a modification of the motor shown in FIG. 11.

FIGS. 11 and 12 show a fourth embodiment of the present invention.

As shown in FIGS. 11 and 12, a thrust receiving member 51d according to this embodiment has a plurality of (for example, three) tapered apex portions 70 and a reduced diameter central portion 72. The rotary shaft insertion hole 52 and the through-hole 56 are always kept under fluid communication with each other through the space 61 between the thrust receiving member 51d and the inner circumferential surface 60 of the bottomed recess 39.

The thrust receiving member 51d having such a structure is suitable for the situation where the outer dimension of the bearing 53 is much larger than that of the rotary shaft insertion hole 52. Namely, since the diameter of a circumscribed circle 62d of the thrust receiving member 51d is rather large, if the thrust receiving member is in the form of a polygonal shape such as a regular triangle, the rotary shaft insertion hole 52 would be clogged or closed.

Accordingly, as shown in FIG. 11, if the central portion 72 is reduced in diameter and the inscribed circle 65d is smaller than the circle of the rotary shaft insertion hole 52, it is possible to always maintain fluid communication between the rotary shaft insertion hole 52 and the space 61.

In the case where the circle of the rotary shaft insertion hole 52 is smaller than the inscribed circle 65d of the thrust receiving member 51d as shown in FIG. 12, the bevelled portion having a bevel circle 64d which is larger than the inscribed circle 65d in the same manner described above may be formed in the bearing.

Additionally, if all of the apex portions 70 are defined by smooth curved surfaces, each apex portions 70 would not be hooked by the bottomed recess 39 or the bearing 53. Also, according to this embodiment, it is possible to reduce a weight of the motor because a weight of the thrust bearing member 51d is small.

Incidentally, the other structures of the fourth embodiment are the same as that of the first embodiment.

Figure 13:
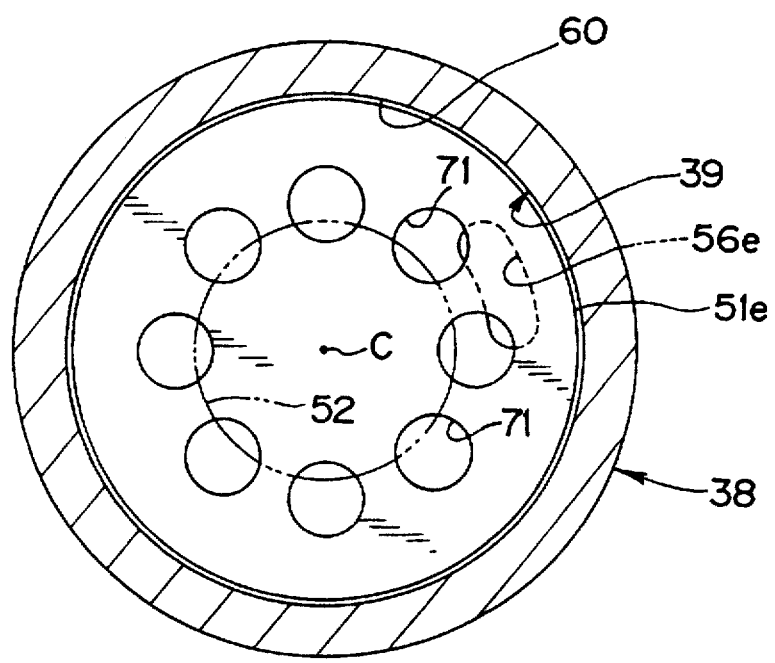
FIG. 13 is a sectional view, similar to FIG. 4, showing a primary part of a motor according to a fifth embodiment of the invention.
Figure 14:
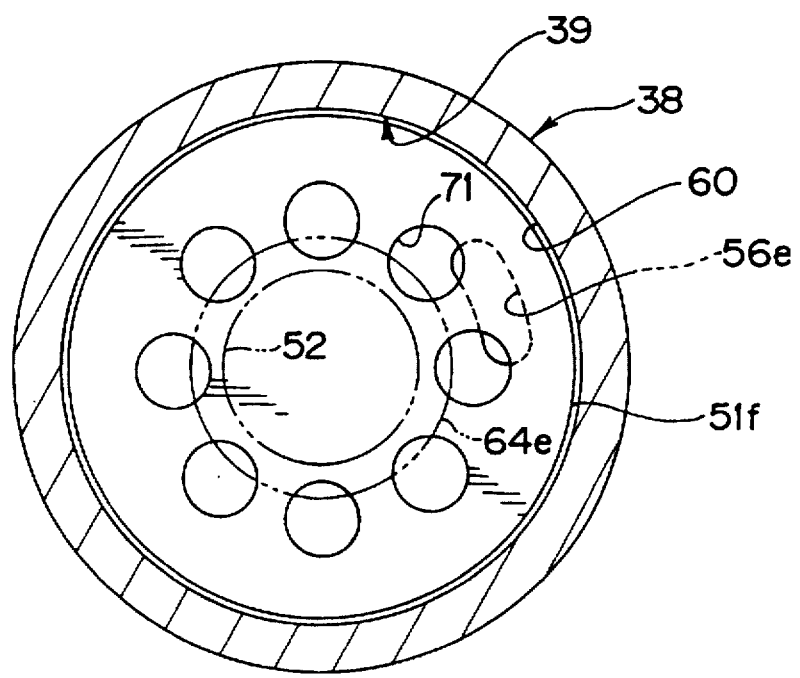
FIG. 14 is a sectional view showing a modification of the motor shown in FIG. 13.
Figure 15:
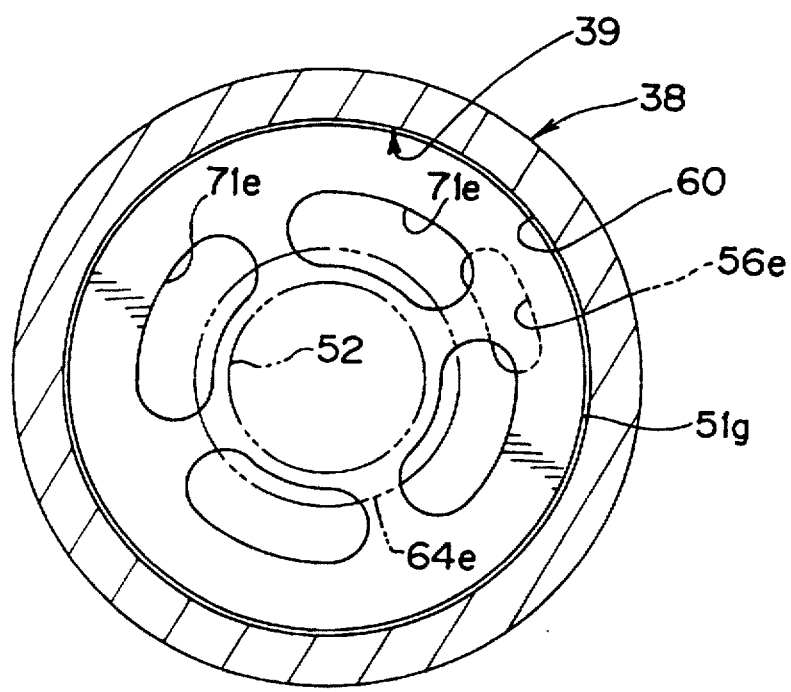
FIG. 15 is a sectional view showing another modification of the motor shown in FIG. 13.

FIGS. 13 through 15 show a fifth embodiment of the present invention.

In this embodiment, the thrust receiving member is formed into a circular shape, and a plurality of communication holes 71 and 71e are formed in the thrust receiving member so as to always communicate with the rotary shaft insertion hole 52 and a through-hole 56e formed in the bottom plate 55 of the bottomed recess 39.

FIG. 13 shows a case where no bevel portion is formed in the bearing. The plurality of communication holes 71 are formed in a circular thrust receiving member 51e, and the communication holes 71 are arranged uniformly in the circumferential direction. Also, by crossing the communication holes 71 with the circle of the rotary shaft insertion hole 52, the communication holes 71 are always kept in fluid communication with the rotary shaft insertion hole 52. In order to always communicate the through-hole 56e with at least one of the communication holes 71, the through-hole 56e is formed in an oblong hole (for example, a hole extending in the circumferential direction).

FIG. 14 shows a thrust receiving member 51f where the bevelled portion is formed in the bearing to compensate for the smaller diameter of the rotary shaft insertion hole 52. The circle of the rotary shaft insertion hole 52 does not cross the communication holes 71 but a bevel circle 64e of the bevelled portion does across the communication holes 71. Accordingly, the rotary shaft insertion hole 52 and the communication holes 71 are always kept in fluid communication with each other through the bevelled portion.

In addition, the shape of each of the communication holes is not limited to a circle, but may instead be formed into an oblong, holes extending in the circumferential direction) formed in a thrust receiving member 51g as shown in FIG. 15.

Figure 16:
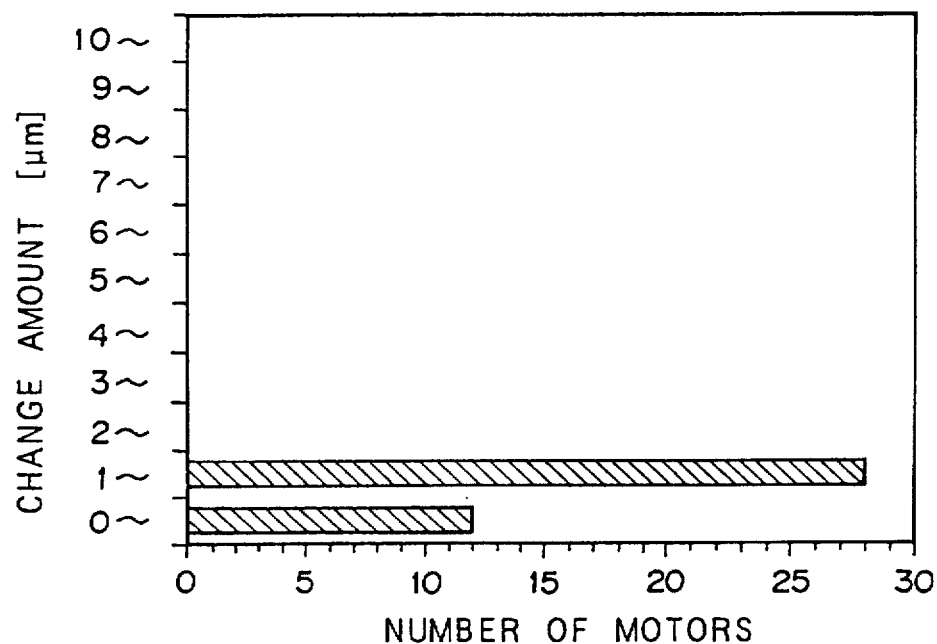
FIG. 16 is a histogram showing experimental results of change amounts of the rotary shaft of the motor in the radial direction according to the invention.
Figure 17:
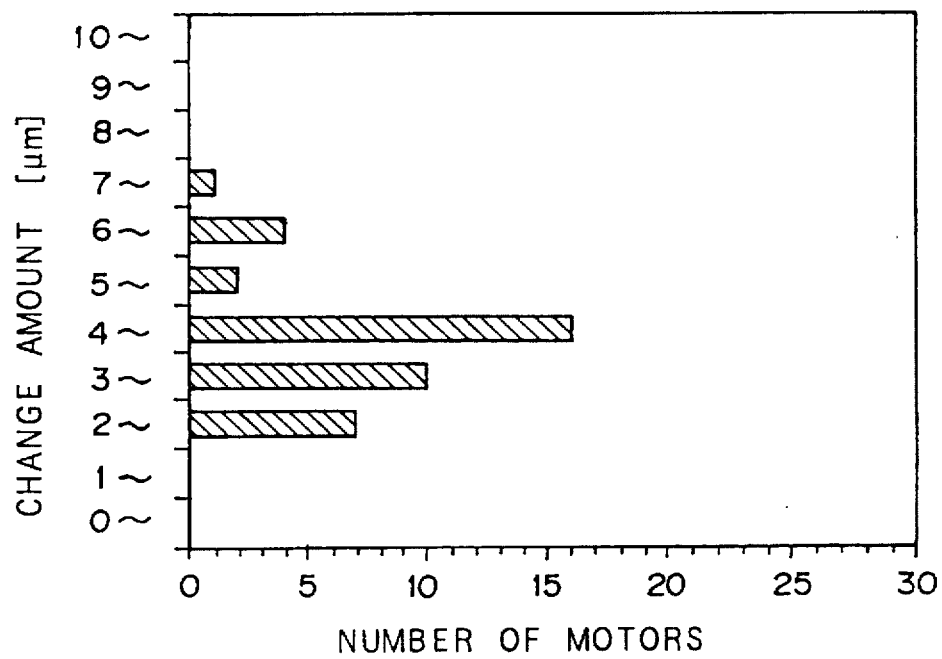
FIG. 17 is a histogram showing experimental results of change amounts of the rotary shaft of the conventional motor in the radial direction.

FIG. 16 shows experimental results of an amount of change (i.e., displacement amount) in the radial direction of the rotary shaft 35 of the miniature motor 30 according to the present invention. FIG. 17 shows experimental results of an amount of change (i.e., displacement amount) in the radial direction of the rotary shaft 6 of the conventional miniature motor shown in FIG. 18. In each graph, the ordinate represents the change amount and the abscissa represents the distribution of the number of the motors. According to this experiment, forty motors were driven and measured for an extended period of time (1,200 hours) while being coupled with a compact disk player for both the present invention and the conventional system.

In the motor 30 according to the present invention, since the holes or cutaways other than the rotary shaft insertion hole 52 were not formed in the bearing 53, the lubricating oil impregnated in the bearing 53 was moved toward the rotary shaft insertion hole 52 by the pumping action and hence was supplied sufficiently to the sliding parts between the bearing 53 and the rotary shaft 35. Accordingly, as shown in FIG. 16, the change amount of the rotary shaft 35 was very small.

In contrast, in the conventional motor as shown in FIG. 18, since the through-holes 13 are independently formed in the bearing 11, the oil impregnated within the bearing 11 was moved toward the through-holes 13 by the pumping action, resulting in insufficient supply to the sliding parts between the bearing 11 and the rotary shaft 6. Accordingly, the lubrication was insufficient and the wear of the sliding parts of the bearing 11 was remarkable, resulting in the increased change amount as shown in FIG. 17.

As described above, according to the present invention, the arcuate groove that is required in the conventional motor may be dispensed with. Since no gap is formed between the bearing 53 and the thrust receiving member of the motor 30, it is possible to shorten the overall axial length $L_1$ of the motor (see FIG. 1) to thereby reduce the length of the motor 30.

Also, since the thrust receiving member is set within the bottomed recess 39 without any pressing forces, there is no likelihood of deformation of the thrust receiving member, and it is possible to stably support the rotary shaft 35 in the thrust direction. Accordingly, the rotary shaft 35 is not moved in the axial direction, and the commutator 44 and the brushes 46 are brought into stable contact with each other, thus rotating the motor at a constant rotational speed.

Since the thrust receiving member may be mounted within the bottomed recess 39 in any direction, it is easy to assemble the motor and to avoid the mounting error.

The thrust receiving member is set within the bottomed recess 39 without any pressing forces but is securely fixed between the bearing and the flat bottom surface. As a result, the thrust receiving member never rotates when the rotary shaft is rotated. Accordingly, there is no fear that the thrust receiving member would be worn due to the friction between the thrust receiving member and the bottom surface.

When the rotary shaft is inserted into the rotary shaft insertion hole of the bearing impregnated with the lubricating oil, the air within the rotary shaft insertion hole is discharged from the space to the outside of the motor through the through-hole. Accordingly, the air will not flow through the bearing. There is no fear that the oil impregnated within the bearing would splash into the interior of the motor by the air. The oil is prevented from sticking to the commutator or the brushes to stabilize the contact. Thus, there is no fear of the reduction in performance and the adverse affect to the service life. Therefore, the quality of the motor is enhanced.

Also, according to the present invention, any holes or cutaways other than the rotary shaft insertion hole are not formed in the bearing of the bearing unit 37. Accordingly, the oil is sufficiently moved toward the rotary shaft insertion hole by the pumping action, and the rotary shaft 35 may be smoothly rotated within the rotary shaft insertion hole with reduced wear.

Also, the overall bottom surface 54 where the conventional arcuate groove is not formed is made flat. It therefore facilitates the molding when the cover member 20 is formed by press molding. Also, the damage of the molds for molding may be suppressed and the durability thereof is enhanced as described below. The dimension of the molds may be kept under a high precision condition for a long period of time.

| (Experimental Results of Durability of Molds) | |
| --- | --- |
| Molds for cover member 20 according to the invention | About ten millions of shots |
| Molds for the conventional cover member 7 | About five millions of shots |

In the foregoing embodiments, the invention is applied to the case where the bearing unit 37 is mounted on the cover member 20 but it is apparent that the invention may be applied to the case where the bottomed recess is formed in the housing 33 and the bearing unit 37 is mounted therein.

It is preferable that the invention may be applied to a thin miniature motor, and it is possible to take a posture use the motor either in a vertical position or a horizontal position.

Although the invention may be applied to a miniature DC motor as described above, it is apparent that the invention may be applied to any other type miniature electric motor such as an AC motor, a stepping motor or the like as desired.

In the drawings, the same reference numerals are used to indicate the like components or members.

Various details of the invention may be changed without departing from its spirit nor its scope. Further, the foregoing description of the embodiments according to the invention is provided for the purpose of illustration only, and not for the purpose of limiting the invention as defined by the appended claims and their equivalents.

What is claimed is:

1. A miniature electric motor having a rotor arranged in a casing within which a stator is mounted, and a rotary shaft of said rotor is rotatably supported by two bearing units, each being mounted on one of opposite end portions of said casing, said one of the bearing units comprising:

a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and a bearing securely fixed in the bottomed recess and brought into pressing contact with said thrust receiving member for supporting said rotary shaft in a rotary shaft insertion hole in a radial direction, wherein said rotary shaft insertion hole and at least one through-hole formed in a bottom plate of the bottomed recess are in fluid communication with each other around and/or through said thrust receiving member, where said thrust receiving member has a size and peripheral shape enabling said fluid communication, wherein said through-hole opens to the outside of the motor to allow air to pass therethrough, wherein said thrust receiving member has a predetermined shape to cover a part of said bottom surface while always maintaining a communication passageway between said rotary shaft insertion hole and said through-hole, and wherein said thrust receiving member has a plurality of apex portions for always allowing fluid communication between said rotary shaft insertion hole and said through-hole through a space between said thrust receiving member and an inner circumferential surface of said bottomed recess.

2. The motor according to claim 1, wherein, assuming that a center of the circle of said through-hole is represented by b, the following relationship holds:

$$f \ge e,$$

where e is the dimension of the thrust receiving member in a direction perpendicular to a line d passing through the center b and the center of the thrust receiving member, and f is the diameter of the through-hole.

3. The motor according to claim 1, wherein said rotary shaft insertion hole and said through-hole are always kept under fluid communication with one another through said space whenever a circle of said rotary shaft insertion hole is greater than an inscribed circle of said thrust receiving member.

4. The motor according to claim 1, wherein said thrust receiving member has a substantially polygonal shape.

5. The motor according to claim 4, wherein said thrust receiving member is substantially in the form of a regular triangular shape.

6. The motor according to claim 4, wherein said thrust receiving member is substantially in the form of a regular hexagonal shape and said through-hole is formed in the vicinity of the inner circumferential surface of said bottomed recess.

7. The motor according to claim 4, wherein said thrust receiving member has a shape similar to a regular square, an arcuate portion having the same center as that of the inner circumferential surface of said bottomed recess is formed in an associated apex of said thrust receiving member; and said through-hole is formed into an oblong hole extending in a circumferential direction and in the vicinity of said inner circumferential surface of said bottomed recess.

8. The motor according to claim 1, wherein said thrust receiving member has a plurality of tapered apex portions and a central portion having a reduced diameter.

9. The motor according to claim 8, wherein an outer dimension of said bearing is larger than the rotary shaft insertion hole, and a circumscribed circle of said thrust receiving member is greater than said rotary shaft insertion hole.

10. The motor according to claim 1, wherein each of said apex portions is defined by a smooth curved surface.

11. The motor according to claim 1, wherein a bevelled portion is formed in an inner circumferential edge of said rotary shaft insertion hole on a side of said thrust receiving member, thereby always communicating said rotary shaft insertion hole with said through-hole with each other through said bevelled portion.

12. The motor according to claim 1, wherein said thrust receiving member has an outer dimension that is substantially equal to or less than a diameter of an inner circumferential surface of said bottomed recess and is laid on said bottom surface without any pressing forces, and wherein said bearing is inserted under pressure into said bottomed recess, and said thrust receiving member sandwiched between said bearing and said bottom surface is kept under a non-rotatable condition.

13. The motor according to claim 1, wherein said thrust bearing member is formed of synthetic resin having good lubrication characteristics.

14. The motor according to claim 1, wherein said bearing units are made of one selected from the group consisting of powder sintered metal and powder sintered alloy of iron copper system impregnated with lubricating oil.

15. The motor according to claim 1, wherein said other bearing units are made of one selected from the group consisting of plastic and general metal material.

16. The motor according to claim 1, said casing comprising:
   a housing formed of conductive material of a cold pressed steel plate in a bottomed hollow shape; and
   a cover member composed of a disk plate made of the same material as that of the housing and mounted on an opening portion of said housing,
   wherein said one bearing unit and said other bearing unit are mounted on said cover member and said housing, respectively, a bottomed hollow cylindrical projection extending to an outside of the motor is integrally formed in a central portion of said cover member, an inside of said projection is said bottomed recess, and an entirety of said bottom surface of said bottomed recess is made flat without any grooves.

17. The motor according to claim 1, wherein said motor is one selected from a miniature DC motor, an AC motor and a stepping motor.

18. A miniature electric motor having a rotor arranged in a casing within which a stator is mounted, and a rotary shaft of said rotor is rotatably supported by two bearing units, each being mounted on one of opposite end portions of said casing, said one of the bearing units comprising:
   a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and
   a bearing securely fixed in the bottomed recess and brought into pressing contact with said thrust receiving member for supporting said rotary shaft in a rotary shaft insertion hole in a radial direction,
   wherein said rotary shaft insertion hole and at least one through-hole formed in a bottom plate of the bottomed recess are in a fluid communication with each other,
   wherein said thrust receiving member has a predetermined shape to cover a part of said bottom surface while always maintaining a communication passageway between said rotary shaft insertion hole and said through-hole,
   wherein said thrust receiving member has a plurality of apex portions for always communicating said rotary shaft insertion hole and said through-hole through a space between said thrust receiving member and an inner circumferential surface of said bottomed recess, and
   wherein a bevelled portion is formed in an inner circumferential edge of said rotary shaft insertion hole on a side of the thrust receiving member, a bevel circle of the beveled portion is larger than an inscribed circle of said thrust receiving member, and said rotary shaft insertion hole and said through-hole are always kept under fluid communication with one another through said space whenever a circle of said rotary shaft insertion hole is smaller than the inscribed circle.

19. The motor according to claim 18, wherein a slant angle θ of said bevelled portion relative to a surface of said thrust receiving member is made small so that a sliding area between said bearing and said rotary shaft is enlarged.

20. A miniature electric motor having a rotor arranged in a casing within which a stator is mounted, and a rotary shaft of said rotor is rotatably supported by two bearing units, each being mounted on one of opposite end portions of said casing, said one of the bearing units comprising:
   a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and
   a bearing securely fixed in the bottomed recess and brought into pressing contact with said thrust receiving member for supporting said rotary shaft in a rotary shaft insertion hole in a radial direction,
   wherein said rotary shaft insertion hole and at least one through-hole formed in a bottom plate of the bottomed recess are in a fluid communication with each other,
   wherein said thrust receiving member has a predetermined shape to cover a part of said bottom surface, while always maintaining a communication passageway between said rotary shaft insertion hole and said through-hole,
   wherein said thrust receiving member is formed in a circular shape, and a plurality of communication holes for always communicating said rotary shaft insertion hole and said through-hole with each other are formed in said thrust receiving member, and
   wherein said communication holes and a circle of said rotary shaft insertion hole are crossed with each other for communication between the communication holes and said rotary shaft insertion hole at all times and said through-hole is formed into an oblong hole which always communicates with at least one of said communication holes.

21. A miniature electric motor having a rotor arranged in a casing within which a stator is mounted, and a rotary shaft of said rotor is rotatably supported by two bearing units, each being mounted on one of opposite end portions of said casing, said one of the bearing units comprising:
   a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and
   a bearing securely fixed in the bottomed recess and brought into pressing contact with said thrust receiving member for supporting said rotary shaft in a rotary shaft insertion hole in a radial direction,
   wherein said rotary shaft insertion hole and at least one through-hole formed in a bottom plate of the bottomed recess are in a fluid communication with each other,
   wherein said thrust receiving member has a predetermined shape to cover a part of said bottom surface, while always maintaining a communication passageway between said rotary shaft insertion hole and said through-hole, wherein said thrust receiving member is formed in a circular shape, and a plurality of communication holes for always communicating said rotary shaft insertion hole and said through-hole with each other are formed in said thrust receiving member, wherein said rotary shaft insertion hole is small so that a circle of said insertion hole is not crossed with said communication holes, wherein a bevelled portion is formed in said bearing with a bevel circle of said bevelled portion being crossed with said communication holes, thereby always communicating said rotary shaft insertion hole with said communication holes with each other through said bevelled portion, and wherein said through-hole has an oblong shape so that said through-hole is always in fluid communication with at least one of said communication holes.

22. The motor according to claim 21, wherein each of said communication holes has a circular shape.

23. The motor according to claim 21, wherein each of said communication holes has an oblong shape, each of said communication hole extending in the circumferential direction.

24. A miniature electric motor having a rotor arranged in a casing within which a stator is mounted, and a rotary shaft of said rotor is rotatably supported by two bearing units, each being mounted on one of opposite end portions of said casing, said one of the bearing units comprising:

a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and wherein said thrust receiving member is made of synthetic resin having good lubrication characteristics substantially in the form of a regular triangle with each apex portion being defined by a smooth curved surface, and said thrust receiving member having an outer dimension which is substantially the same or somewhat smaller than a diameter of an inner circumferential surface of said bottomed recess is laid on said bottom surface without any pressing forces, wherein said bearing is securely fixed within said bottomed recess, said thrust receiving member being sandwiched between said bearing and said bottom surface being kept under a non-rotatable condition; and wherein a diameter of a circle of said rotary shaft insertion hole is less than a diameter of an inscribed circle of said thrust receiving member, a bevelled portion is formed at an inner circumferential edge of said rotary shaft insertion hole on a side of said thrust receiving member, a bevel circle having a diameter portion for said bevelled portion which is greater than said inscribed circle, and said rotary shaft insertion hole and said through-hole are always kept in fluid communication with one another through a space between said thrust receiving member and said inner circumferential surface.

25. A miniature electric motor having a rotor arranged in a casing within which a stator is mounted, and a rotary shaft of said rotor is rotatably supported by two bearing units, each being mounted on one of opposite end portions of said casing, said one of the bearing units comprising:

a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and a bearing securely fixed in the bottomed recess and brought into pressing contact with said thrust receiving member for supporting said rotary shaft in a rotary shaft insertion hole in a radial direction, wherein said rotary shaft insertion hole and at least one through-hole formed in a bottom plate of the bottomed recess are in fluid communication with each other, wherein said thrust receiving member has a predetermined shape to cover a part of said bottom surface while always maintaining a communication passageway between said rotary shaft insertion hole and said through-hole, wherein said thrust receiving member is formed in a circular shape, and a plurality of communication holes for always communicating said rotary shaft insertion hole and said through-hole with each other are formed in said thrust receiving member, and wherein said communication holes and a circle of said rotary shaft insertion hole are crossed with each other for communication between the communication holes and said rotary shaft insertion hole at all times and said through-hole always communicates with at least one of said communication holes.

26. A miniature electric motor having a rotor arranged in a casing within which a stator is mounted, and a rotary shaft of said rotor is rotatably supported by two bearing units, each being mounted on one of opposite end portions of said casing, said one of the bearing units comprising:

a thrust receiving member for supporting an end portion of said rotary shaft in a thrust direction, said thrust receiving member being laid on a flat bottom surface of a bottomed recess formed in the casing, with a dimension equal to or smaller than that of the bottomed recess; and a bearing securely fixed in the bottomed recess and brought into pressing contact with said thrust receiving member for supporting said rotary shaft in a rotary shaft insertion hole in a radial direction, wherein said rotary shaft insertion hole and at least one through-hole formed in a bottom plate of the bottomed recess are in fluid communication with each other, wherein said thrust receiving member has a predetermined shape to cover a part of said bottom surface while always maintaining a communication passageway between said rotary shaft insertion hole and said through-hole, wherein said thrust receiving member is formed in a circular shape, and a plurality of communication holes for always communicating said rotary shaft insertion hole and said through-hole with each other are formed in said thrust receiving member, wherein said rotary shaft insertion hole is small so that a circle of said insertion hole is not crossed with said communication holes, wherein a bevelled portion is formed in said bearing with a bevel circle of said bevelled portion being crossed with said communication holes, thereby always communicating said rotary shaft insertion hole with said communication holes through said bevelled portion, and wherein said through-hole is always in fluid communication with at least one of said communication holes.

* * * * *